R. M. G. PHILLIPS.
COOKING APPARATUS.
APPLICATION FILED AUG. 10, 1914.
1,174,442.
Patented Mar. 7, 1916.
4 SHEETS—SHEET 3.
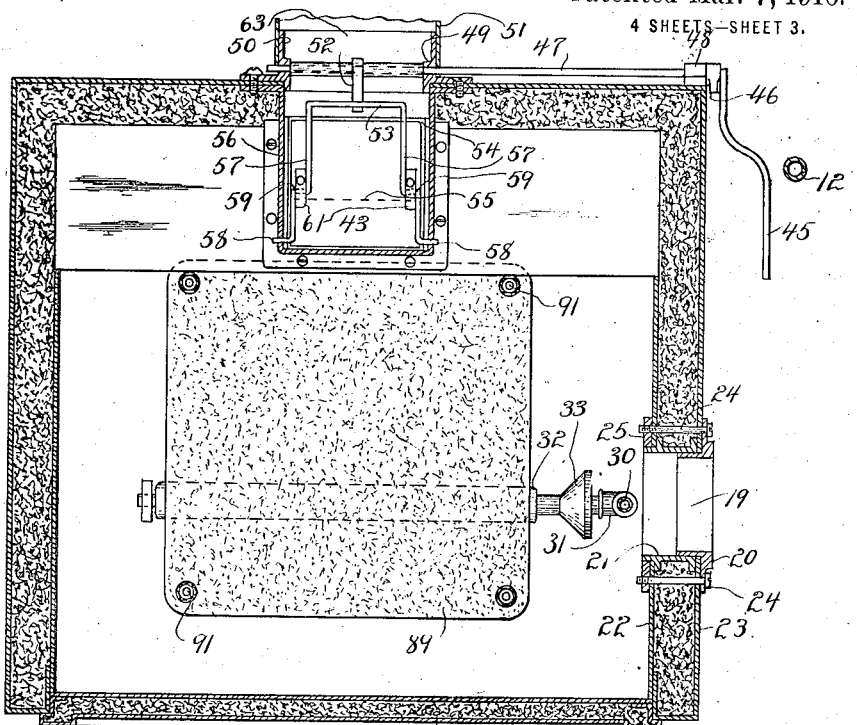
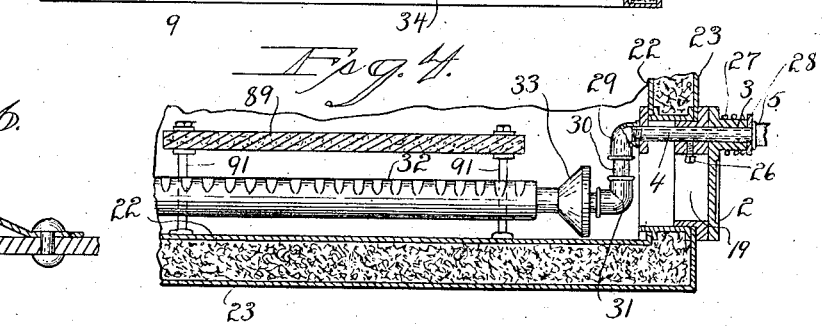
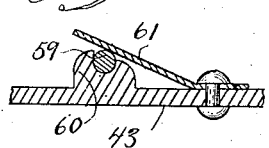
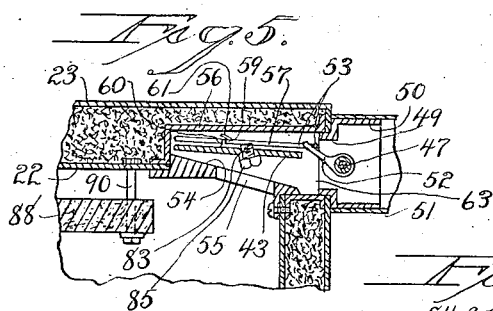
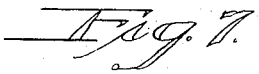
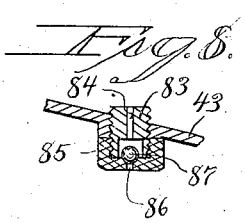

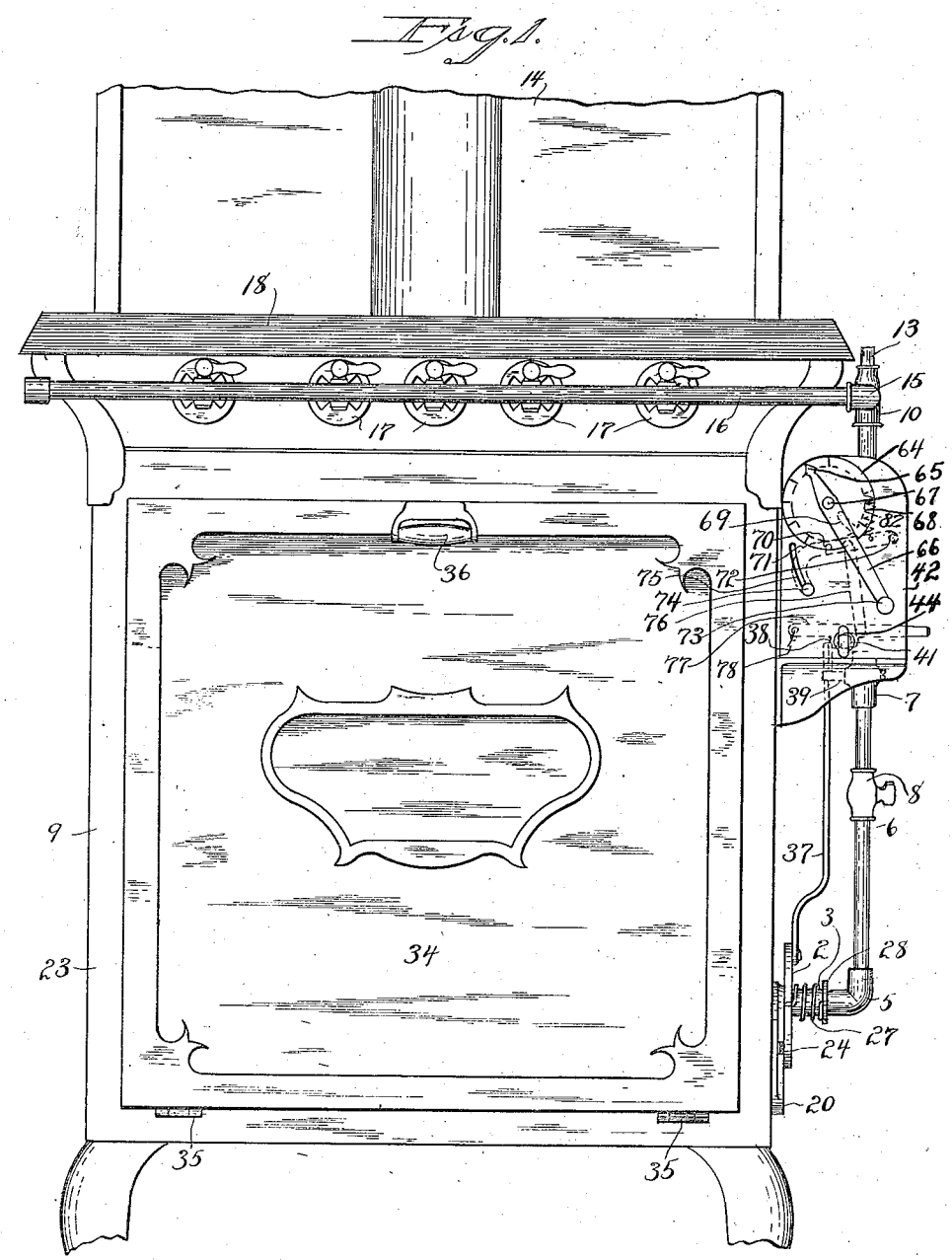

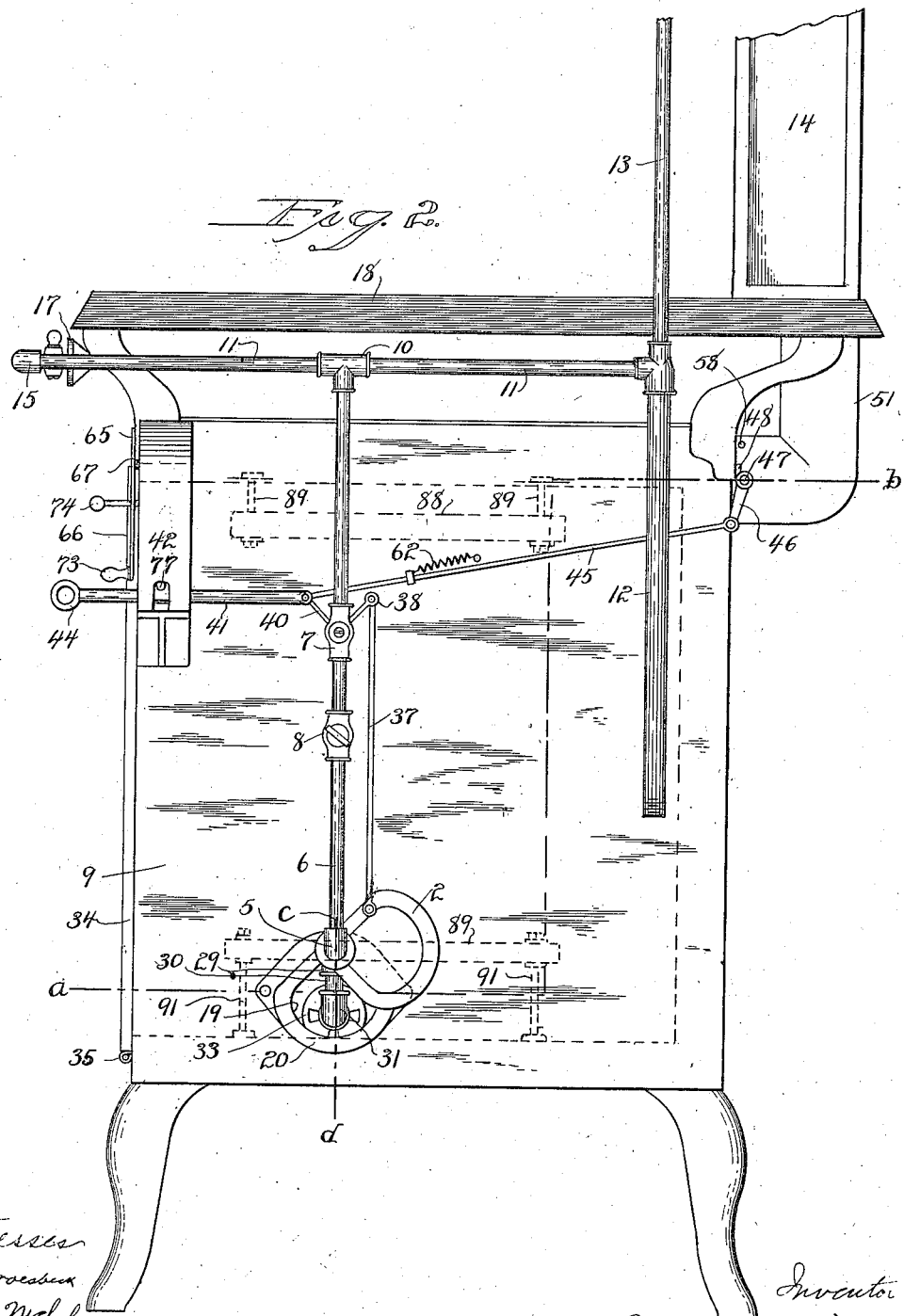

R. M. G. PHILLIPS.
COOKING APPARATUS.
APPLICATION FILED AUG. 10, 1914.
1,174,442.
Patented Mar. 7, 1916.
4 SHEETS—SHEET 4.
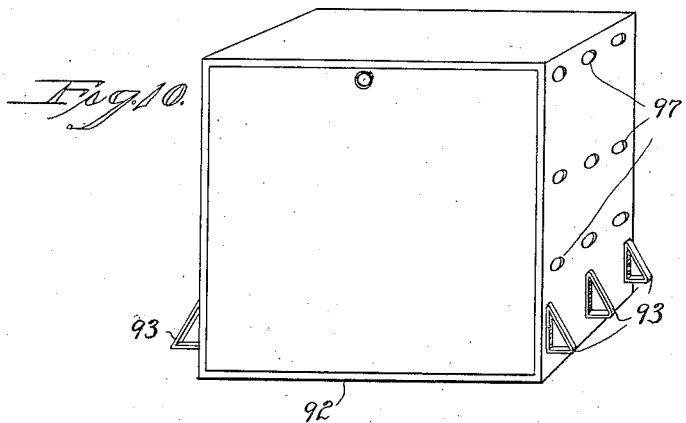
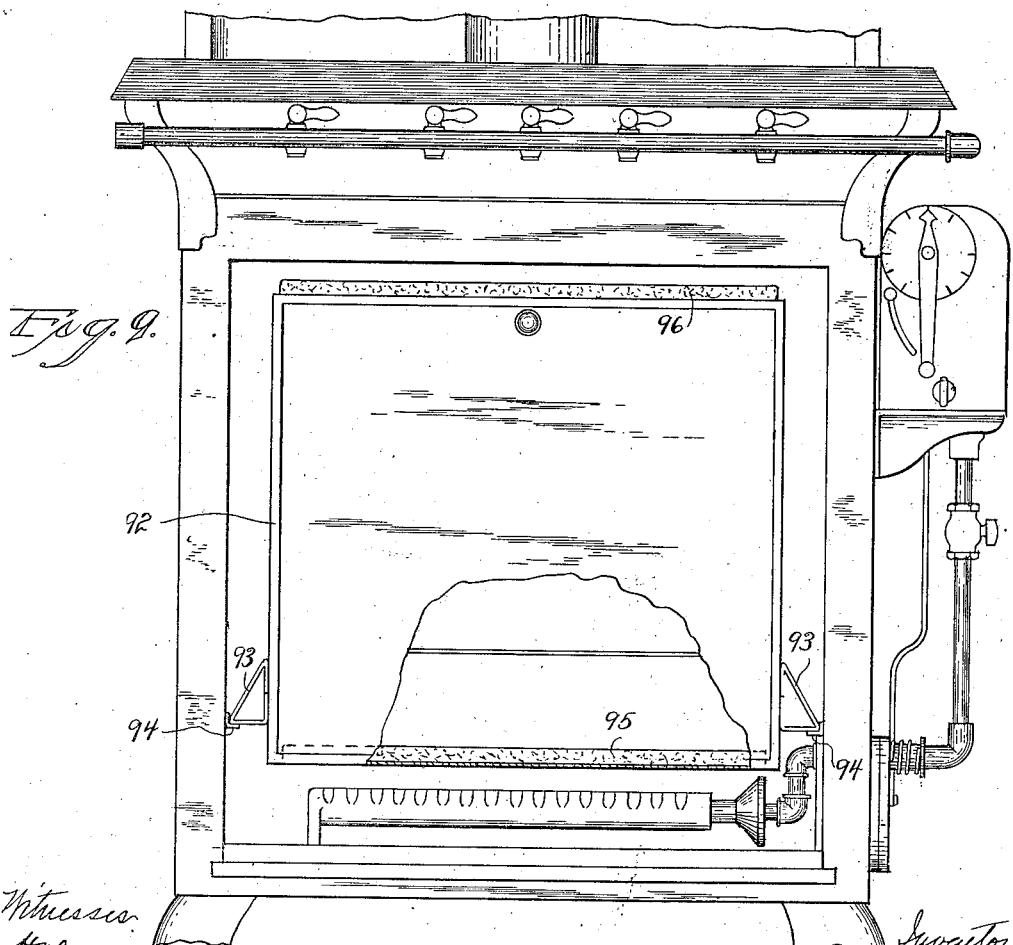

UNITED STATES PATENT OFFICE.

ROSS M. G. PHILLIPS, OF WEST HAVEN, CONNECTICUT.

COOKING APPARATUS.

1,174,442.  Specification of Letters Patent.  Patented Mar. 7, 1916.

Application filed August 10, 1914. Serial No. 856,044.

*To all whom it may concern:*

Be it known that I, Ross M. G. PHILLIPS, a citizen of the United States, residing at West Haven, in the county of New Haven and State of Connecticut, have invented a new and useful Improvement in Cooking Apparatus; and I do hereby declare the following, when taken in connection with the accompanying drawings and the characters of reference marked thereon, to be a full, clear, and exact description of the same, and which said drawings constitute part of this application, and represent, in—

Figure 1 a view in front elevation of a cooking apparatus constructed in accordance with my invention, the hood and legs being broken away. Fig. 2 a view of the apparatus in side elevation with its shutter and damper open. Fig. 3 a view of the apparatus in horizontal section on the irregular line *a—b* of Fig. 2. Fig. 4 a broken view of the apparatus in vertical section on the line *c—d* of Fig. 2, showing the shutter in its closed position. Fig. 5 a broken view in vertical section through the damper which is shown in its open position. Fig. 6 a broken sectional view showing one of the two springs employed for suspending the damper from the damper-suspension bail. Fig. 7 a broken sectional view through the lower part of the timing-mechanism, showing its releasing-lever. Fig. 8 a broken sectional view of one form of relief-valve which may be used in the damper 43 employed as a closure for the egress draft-passage. Fig. 9 a broken view in front elevation of my improved cooking apparatus shown as provided with a removable food-container for use when desired. Fig. 10 a detached perspective view of the removable food-container.

My invention relates to an improved gas-burning cooking apparatus having ingress and egress draft-passages and provided with means for automatically cutting off the supply of gas and closing and sealing the said passages at a predetermined time, the object being to provide a simple, convenient, economical and effective cooking apparatus of the character described.

With these ends in view, my invention consists in a cooking apparatus having certain details of construction and combinations of parts as will be hereinafter described and pointed out in the claim.

In carrying out my invention as herein shown, I employ an automatically operated ingress draft-shutter or closure 2 furnished at its upper end with an outwardly projecting hub 3 by means of which it is suspended so, as to oscillate in a vertical plane upon the projecting outer portion of a gas-inlet pipe 4 the outer end of which is connected by an elbow 5 with a vertically arranged gas-pipe 6 containing an automatic gas-cock 7 and a manual gas-cock 8, the latter for regulating the amount of gas supplied to the oven 9 and for enabling the gas to be lighted with safety. The pipe 6 which is located adjacent to the right hand side wall of the oven 9, enters at its upper end a T-connection 10 in a horizontal gas-pipe 11 the rear end of which is connected with a gas-supply pipe 12 from which a gas-pipe 13 leads into a hood or warming oven 14, which may be of any approved construction. The forward end of the pipe 11 is furnished with an elbow 15 connected with a horizontal gas-pipe 16 extending across the front of the oven 9 and supplying gas to a series of burners 17 extending under the burner-plate 18. The gas connections described may, of course, be varied as desired. The said shutter or closure 2 is employed to open and close and seal an ingress draft-passage 19 provided by a shutter-seat 20 the outer edge of which is ground to be snugly fitted by the inner face of the shutter, so that when the shutter is in its closed position no air can enter the oven 9 through the said inlet draft-passage 19. The said shutter-seat 20 is fitted into the outer end of what I may term a flanged spacing-bushing 21 which extends between the inner and outer walls 22 and 23 of the insulated oven or cooking compartment 9, the space between the said walls being packed with any suitable insulating material for conserving the heat of the oven for the cooking of the food placed therein in the manner of the so called "fireless cookers." The said shutter-seat 20, spacing-bushing 21 and the walls or shells 22 and 23 of the oven are clamped together by transversely arranged machine-screws 24 passed inward through the flange of the shutter-seat 20 and threaded into a retaining-ring 25 encircling the projecting inner end of the bushing 21 and placed against the inner face of the inner wall or shell 22 of the oven. The gas-inlet pipe 4 upon which the shutter 2 oscillates, is mounted in the upper portion of the shutter-seat 20 in which it is secured by a set-screw 26. A spring 27 encircling the hub 3 of the shutter 2 is connected at one end therewith and at the other end with a washer 28 upon the outer end of the pipe 4, this spring exerting a constant effort to swing the shutter downward into its closed position and also pressing it inwardly upon the shutter-seat 20 to more effectively seal the ingress draft-passage 19. The projecting inner end of the said pipe 4 receives an elbow 29 connected by a short pipe 30 to an elbow 31 leading into a horizontally arranged burner or preheater 32 permanently located within the bottom of the oven, a mixing-chamber 33 being located between the elbow 31 and the burner 32. This mixing chamber 33 is accessible for adjustment through a double walled insulated oven door 34 closing the front of the oven and furnished with hinges 35 and a handle 36. The said shutter 2 is automatically swung into its open and closed or sealed positions by means of a vertically arranged operating-rod 37 the upper end of which is connected to the outer end of an arm 38 mounted in the projecting outer end of the stem 39 of a valve (not shown) located within the automatic gas-cock 7. The said stem 39 is also provided with an arm 40 connected with a horizontal operating-rod 41 extending forward through the lower end of the casing of a timing-mechanism 42 automatically controlling the closing of the shutter 2 and also the egress draft-damper 43, the said rod 41 being furnished at its forward end for its manual operation, with a ring-handle 44. The said arm 40 is also connected with a rearwardly extending damper-rod 45 the rear end of which is connected with a rock-arm 46 mounted upon the outer end of a horizontal rock-shaft 47 journaled at its outer end in a bracket 48 applied to the back of the oven 9 and journaled at its inner end in a flue-coupling 49 having a flange 50 over which the lower end of a ventilating-flue 51 is sleeved.

The rock-shaft 47 is provided at a point within the flange 50 with a rock-arm 52 notched for the reception of the cross-bar or reach of a bail 53 by means of which the damper 43 is raised above and lowered upon a damper-seat 54 forming the egress-draft opening 55 of the oven 9, the said casting 54 being inserted into an opening formed for its reception in the upper rear corner of the said oven about midway the width thereof. The said damper 43 is virtually housed within a damper-casing 56 interposed, as it were, between the flue-casing 50 and the damper-seat 54. The said arms 57 of the bail aforesaid are extended forward and bent outwardly to form pintles 58 journaled in the side walls of the damper-casing 56. The said arms 57 of the bail are about midway of their length, offset to form trunnions 59 respectively seated in slotted lugs 60 formed upon the upper face of the damper 43 just within the side edges thereof, the trunnions 59 being held in place in the lugs 60 by means of springs 61. Under this construction, the damper 43 is suspended from the suspension bail 53 in such a way that it is free to tilt and accommodate itself to the upper face of the damper-seat so as to effectively close and seal the egress-draft passage 55.

Under the construction described, the spring 62 attached to the rod 45 exerts a constant effort to close the ingress draft-passage 19 by means of the shutter 2, and the egress draft-passage 63 by means of the damper 43, the said passages being simultaneously closed by the spring 62 and simultaneously opened by manually pulling the rod 41 forward by its projecting handle 44 against the tension of the spring 62.

The timing mechanism 42 constitutes automatic means for controlling the closing and sealing of the passages 19 and 55 at a predetermined time. It is unnecessary to describe the timing mechanism in detail, reference being had to the mechanism of the same character disclosed in my pending application filed August 1, 1913, Serial No. 782,245.

It will be sufficient in this connection to say that the timing-mechanism 42 is furnished with a graduated dial 64 located in front of the casing containing the said mechanism and swept by the pointer 65 of a setting-lever 66 secured to the projecting forward end of an arbor 67 carrying a timing-disk 68 located within the said casing and having a slot 69 receiving a timing-pin 70 mounted in a timing-lever 71 hung on a stud 72 within the said casing. The said setting-lever 66 is furnished at its lower end with a handle 73, while the lever 71 is furnished at its inner end with a handle 74 projecting forward through a slot 75 in the front of the casing. From the lever 71 depends a link 76 the lower end of which is attached to a releasing lever or trigger 77 hung upon a pivot 78 within the casing 42 and furnished with a locking-notch 79 which adapts the trigger to be latched over the operating-rod 41 as shown in Fig. 7. The said rod 41 is provided with a stop-notch 80 which enters the casing 42 through a clearance-opening 81 in the rear face thereof.

Under the construction above described, the setting of the timing-mechanism becomes a condition precedent to the turning on of the gas which is constantly resisted by the spring 62. To operate my improved cooking-oven, the handle 74 must first be pulled down to withdraw the timing-pin 70 from the slot 69 in the timing-disk 68 which being thus left free to turn, may be rotated by means of the setting-lever 66 which is set by the pointer 65 on the dial 64. The pulling down of the handle 74 depresses the lever 71 and hence the link 76 and the releasing-lever 77 which latter is thus brought into position for co-action with a notch 80 in the rod 41. Without such co-action the handle 41 cannot be locked in its forwardly extending position without which the gas-cock 7 will not stay open, nor the shutter 2 and the damper 43. The timing mechanism having thus been set, the handle 44 is pulled forward whereby the square shoulder of the notch 80 in the rod 41 will be positioned in front of the lever 77 as shown in Fig. 7. It is desirable before setting the timing-mechanism to shut off the gas from the preheater by manually closing the gas-cock 8, whereby an accumulation of gas in the oven is prevented in case any appreciable time elapses between the setting of the timing-mechanism and the lighting of the preheater. The said cock 8 is also used as desired, to regulate the size of the flame after the apparatus has been started in operation.

During the entire oven-heating period which is determined in length by the setting of the timing mechanism, the heating of the oven will proceed, air being drawn freely into it through the ingress draft-passage 19 and leaving it through the egress draft-passage 65. As soon, however, as the time-limit has been reached, the registration of the slot 69 with the pin 70 permits the spring 82 to act to lift the lever 71 which in turn will lift the link 76 and the releasing-lever 77 which latter will thus be disengaged from the square shoulder of the notch 80, leaving the spring 62 free to pull the rods 41 and 45 from front to rear, whereby the gas-cock 7 is closed, the shutter 2 permitted to be swung into position to close and seal the ingress draft-passage 19 by its spring 27, and the damper 43 permitted to settle by gravity into position to close and seal the egress draft-passage 65. If it is desired to forestall the time-limit and shut off the gas ahead of the time set, it is only necessary to manually lift the lever 77 to release the collar 80 and so permit the gas to be automatically shut off and the ingress and egress-passages to be closed and sealed.

As shown in Figs. 5 and 8 of the drawings, the damper 43 is furnished with a relief-valve comprising, as shown, a nipple 83 having a relief-passage 84, a cap 85 having a relief-passage 86, and a ball-valve 87 normally closing the passage 86 but rising from its seat when the pressure within the oven due to steam from the foods passes a predetermined point. I do not limit myself, however, to any particular form of relief-valve for use in this place, and may dispense with it altogether.

As herein shown, I provide my improved cooking apparatus with an upper thermostone 88 and a lower thermostone 89, the upper thermostone being suspended near the top of the cooking compartment in the oven 9 by means of suspension rods 90, and the lower thermostone 89 being supported upon posts or pedestals 91 rising from the bottom of the oven. The upper thermostone 88 may be of suitable size and suspended in any convenient manner, the only requirement being that it shall be placed so as not to interfere with the free draft through the egress-draft passage 55 of the oven. The lower thermostone 89 may also be of any approved size and arrangement, the only requirement being that it shall be lifted sufficiently above the burner so as not to interfere with combustion or be scorched or disintegrated by the flame of the burner.

Instead of introducing the food-container directly into the oven, I may, if preferred, employ a food-container 92 as shown in Figs. 9 and 10, this container being by preference constructed of thin sheet-metal affording a negligble barrier for the heat of the oven. Since the food-container is readily removable from the oven it may be more easily kept clean than the oven itself, which may from time to time be soiled by foods spattering or boiling over. As shown, the container is furnished upon its side walls with suspension struts 93 which ride into horizontal channels 94 secured to the inner side walls of the oven proper near the lower end thereof. Under this arrangement and as shown in Fig. 9, a free passage around the food-container 92 on all sides is provided for. As shown in Fig. 9 the food-container is provided with a lower thermostone 95 set within its lower end, and an upper thermostone 96 set upon its top. Either both or neither of these thermostones may be employed. The same may be said with regard to the thermostones 88 and 89 before referred to. As shown in Fig. 9 the food-container is furnished in its side walls with air-holes 97 which would be omitted in case natural gas was used as a fuel so as to avoid contamination of the food by the odors of such gas.

In a broad view of my improvement, it consists of an oven constructed to retain the heat, containing a burner or preheater, and furnished with an ingress draft-passage and an egress draft-passage adapted to be sealed at a predetermined time under the control of automatic means which also controls means for shutting off the fuel-supply. The particular construction of the oven and its various accessories, may, as I would have it understood, be widely varied without departing from my invention.

I claim:

In a cooking apparatus for conjoint fire and fireless cooking, the combination with an insulated cooking compartment having an ingress draft-passage in one of its side walls and an egress draft-passage in its upper portion, of a burner located within the lower portion of said compartment, a gas-pipe leading into the said compartment for supplying gas to the said burner, an oscillating closure mounted upon the said pipe for closing the ingress draft-passage, a closure for the egress draft-passage, a fuel-supply, cocking means for maintaining the said closures in their open positions, means for automatically releasing the said cocking means for closing the said closures and shutting off the fuel-supply, and means independent of the said fuel-supply, for manually setting the apparatus for fire cooking and cocking the said cocking means.

In testimony whereof, I have signed this specification in the presence of two subscribing witnesses.

ROSS M. G. PHILLIPS.

Witnesses:
 CLARA L. WEED,
 HAROLD D. PEARSON.